June 30, 1970    W. E. BARTLEY ET AL    3,517,761

WEIGHING BOTTOM BLOCK

Filed Feb. 13, 1969

INVENTORS:
WILBUR E. BARTLEY
HARRY W. WIGMAN

BY: James E. Nilles

ATTORNEY

United States Patent Office 3,517,761
Patented June 30, 1970

3,517,761
WEIGHING BOTTOM BLOCK
Wilbur E. Bartley, West Bend, and Harry W. Wigman, Milwaukee, Wis., assignors to Harnischfeger Corporation, Milwaukee, Wis., a corporation of Wisconsin
Filed Feb. 13, 1969, Ser. No. 799,034
Int. Cl. B66c 1/40; G01g 19/14
U.S. Cl. 177—147      12 Claims

ABSTRACT OF THE DISCLOSURE

A falling block for a crane or the like and including a weight measuring hook of the tension load cell type. A lateral collar is carried by the falling block frame for restraining lateral movement of the hook.

Background of the invention

The invention pertains to weighing devices incorporated into the falling block of a crane hoist or the like and in which the weight sensing device is a tension load cell.

The present invention is in the nature of an improvement over the weighing bottom block shown in the U.S. Pat. 2,820,624, issued Jan. 21, 1958 to H. L. Koegel and assigned to an assignee common with the present application. That prior art device utilized compression cells to measure the weight on the hook, was complex in construction and required extreme accuracy in its production and assembly in order to result in accurate operation. Furthermore, that prior device required considerable vertical space due to its size, which resulted in decreasing lifting height of the hook and its load.

Another type of prior art device over which the present invention is an improvement is shown in the U.S. Pat. 3,290,931, issued Dec. 13, 1966 to R. Fowkes et al. and which utilized a subframe for the hook and load sensing device between the subframe and main block, resulting in a complicated structure.

Summary

The present invention provides a falling block for a crane, hoist or the like, and in which a tension load cell is connected directly between the main frame of the block and the cross head of the hook. A fixed collar restrains lateral movemnet of the load cell and hook relative to the main frame and thereby protects the cell and insures accurate reading thereby. The cell is furthermore suspended by a spherical bearing which eliminates friction and lateral loading on the cell, and consequently, results in accurate weighing.

The entire weighing block provided by the present invention is simple in construction, economical to manufacture and assemble, accurate and foolproof in operation, and compact in design, particularly in a vertical direction which results in increased lifting height over the prior art.

These and other objects and advantages will appear hereinafter as this disclosure progresses.

Description of a preferred embodiment

Figure 1:
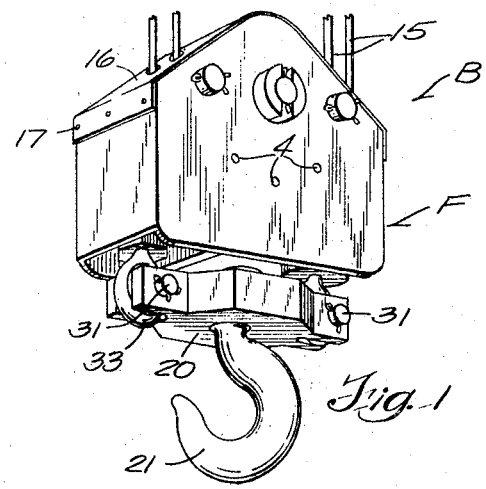
FIG. 1 is a perspective view of a weighing bottom block embodying the invention.

The weighing block B of the present invention comprises a main frame F fabricated from two spaced apart and vertically disposed side walls 2 and 3 which are rigidly secured together by a series of pins 4 welded thereto, and also by a collar 5 welded across the lower edges of the side walls, the collar has an aperture 6 for a purpose that will appear later. End plates 7 and 8 are welded across the ends of the side walls, thereby also contributing to a particularly rigid and strong main frame F.

A pair of sheaves 9 and 10 are journalled on shaft 11 which in turn is mounted in the bearing blocks 12, 13 welded, respectively, to side walls 2 and 3 adjacent the upper, central portion thereof. Anti-friction, needle bearings 14 support the sheaves on shaft 11. Cables 15 extend around the sheaves and upwardly therefrom when they are supported by a crane, hoist or other machinery (not shown). A sheave guard 16 is removably secured, by screws 17, across the top of the frame.

A cross head 20, bifurcated at each end, is disposed in a generally horizontal position adjacent the lower edge of the frame F. A load carrying member, such as a hook 21 extends through the vertical opening 22 in the cross head and is held captive therein by a collar 23 held in place by a roll pin 24.

An anti-friction thrust bearing assembly 25 is located between the lower surface of collar 23 and a counter bore 26 formed in the upper side of cross head 20. The assembly 25 rotatably supports the hook 21 which can turn freely in the cross head about a vertical axis.

The upper end of the hook, on which collar 23 is secured, is located within the aperture 6 of the fixed collar 5 of the frame. The hook is free to move laterally within aperture 6 within restricted limits. Thus the collar 5 restrains swaying movement of the load and takes the side load off of and protects the weighing cell or cells C, now to be described.

The cross head 20 may be supported by a pair of tension load cells, one at each end of the head. Alternatively, the head 20 may be supported by a single load cell C at one end, as shown in the drawings, while the other end of the head is supported by a dummy load cell DC. The shape and size of the cell C and dummy cell DC are the same, as are their mountings to the frame F and head 20, and thereby the interchange can be readily made between arrangements where one or two load cells are used. When only one tension gauge or cell is used, an accuracy of plus or minus 2 percent of the lifted load is obtainable. When two load cells are used, an accuracy of plus or minus one-tenth of one percent of the lifted load is possible.

The connections of the load cell C and the dummy cell DC to the frame F and the cross head 20 are the same and are by means of spherical bearings 30 which reduce friction between the parts and in the system generally, and eliminate lateral loading which would otherwise preclude accurate weighing measurements.

Figure 4:
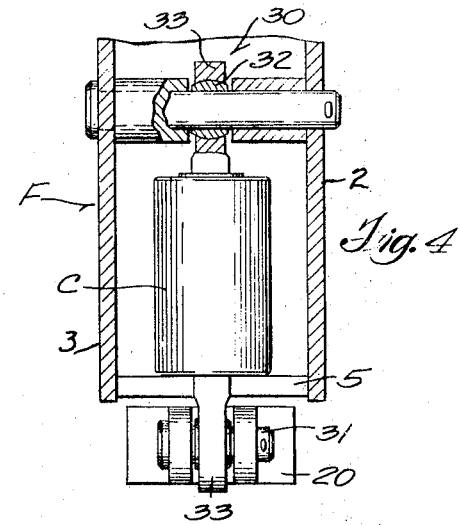
FIG. 4 is a cross sectional view taken generally along line 4—4 in FIG. 2, with certain parts shown as being broken away.
Figure 3:
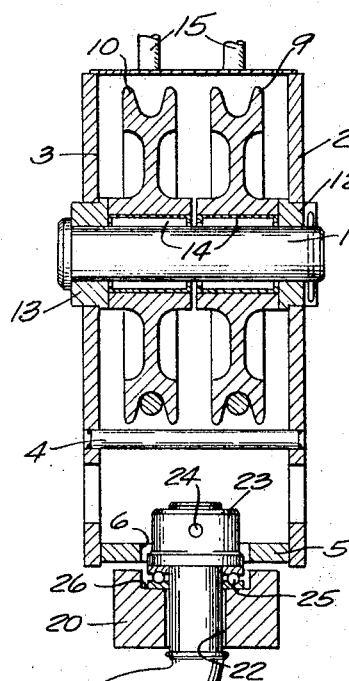
FIG. 3 is a cross sectional view taken along line 3—3 in FIG. 2.
Figure 2:
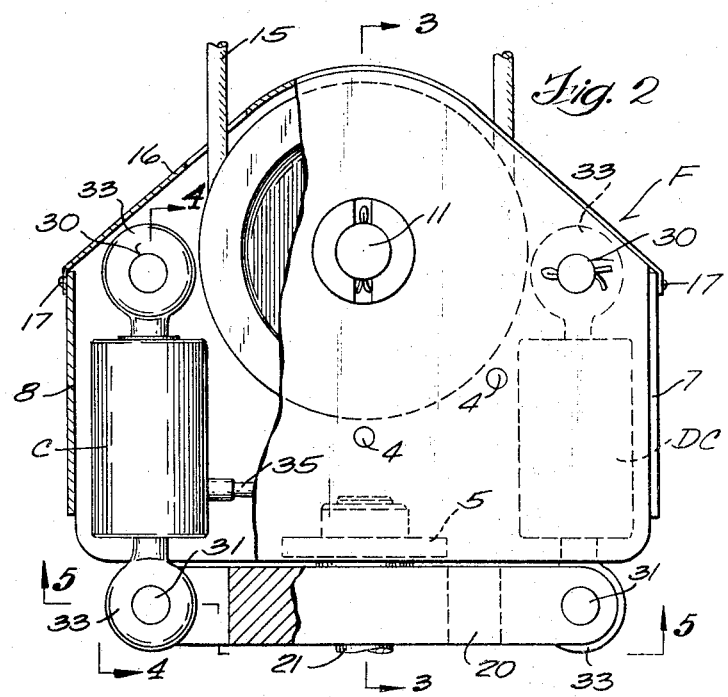
FIG. 2 is a side elevational view of the block shown in FIG. 1, but on an enlarged scale, and with certain parts shown as being broken away or in cross section for the sake ot clarity.
Figure 5:
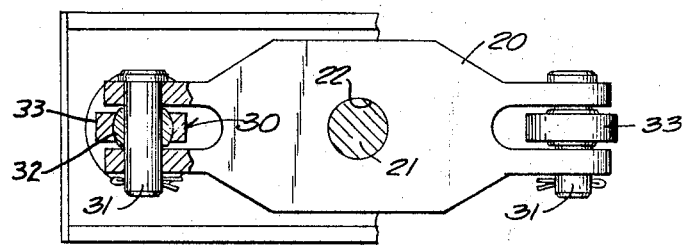
FIG. 5 is a bottom view of the cross head shown in FIG. 2, the view being taken generally along the line 5—5 in FIG. 2; certain parts being shown in section.

As shown in FIGS. 4 and 5, these connections include a shaft 31 having a partially spherical ball 32 thereon and around which the eyebolt 33 can swivel. The eyebolts at their other end are threadably engaged in the ends of the cells.

The eyebolts at the lower end of the cells are located on their shafts between the bifurcated ends of the cross head, thus providing good stability against tilting of the cells or cross head.

The tension gauge or load cells C are of the hermetically sealed type which deflect, a certain amount at their rated load capacity. Cells of various capacities are used depending on the size of crane or load carrying characteristics of the machine on which they are to be used. The deflection of the cells is measured through the electrical wires 35 leading from the cell to the conventional print out reading device, or the like, not shown.

Résumé

The weighing block provided by the present invention utilizes a tension cell or cells connected directly between the main frame and the load carrying cross head, and has provision for restricting lateral movement of the suspended cross head. The block is compact and of relatively low height, resulting in increased lifting height as compared to prior art blocks. Friction and lateral loading of the cells and of the entire system have been minimized to result in an accurate, simple and trouble-free weighing block.

We claim:

1. A weighing bottom block for cranes, hoists or the like comprising, a main frame, sheave means mounted in said frame adjacent an upper portion thereof, a cross head located adjacent a lower portion of said frame and extending in a generally horizontal direction, tension load cell means having a connection directly with said main frame and also with said cross head, load carrying means connected to said cross head for suspending a load therefrom, said tension load cell means extendingly deflecting when a load is imposed thereon whereby said deflection can be measured, and lateral restraining means carried by said frame for restraining lateral movement of said load carrying means and thereby reducing side loading on said tension load cell means.

2. A block as defined in claim 1 further characterized in that said restraining means comprises a collar having an aperture, and said load carrying means extends into said aperture for limited lateral movement therein.

3. A block as defined in claim 1 further characterized in that said connections between said tension load cell means and said frame and cross head are comprised of swivel joints to thereby reduce friction and side loading of said cell means.

4. A block as defined in claim 1 further characterized in that said frame includes a pair of vertically disposed, spaced apart side walls rigidly secured together, and said tension load cell means extends upwardly between said side walls and is secured to an upper portion of said side walls, said cell means also extends below said side walls for attachment to said cross head.

5. A block as defined in claim 2 further characterized in that said frame includes a pair of vertically disposed, spaced apart side walls rigidly secured together, and said tension load cell means extends upwardly between said side walls and is secured to an upper portion of said side walls, said cell means also extends below said side walls for attachment to said cross head.

6. A block as defined in claim 5 further characterized in that said collar is secured between said side walls adjacent the lower portion thereof.

7. A block as defined in claim 5 further characterized in that said connections between said tension load cell means and said frame and cross head are comprised of swivel joints to thereby reduce friction and side loading of said cell means.

8. A block as defined in claim 6 further characterized in that said connections between said tension load cell means and said frame and cross head are comprised of swivel joints to thereby reduce friction and side loading of said cell means.

9. A weighing bottom block for cranes, hoists or the like comprising, a main frame, sheave means mounted in said frame adjacent an upper portion thereof, a cross head located adjacent a lower portion of said frame and extending in a generally horizontal direction, tension load cell means having a connection directly with said main frame and said cross head, said connections between said tension load cell means and said frame and cross head are comprised of swivel joints to thereby reduce friction and side loading of said cell means, load carrying means connected to said cross head for suspending a load therefrom, said tension load cell means extendingly deflecting when a load is imposed thereon whereby said deflection can be measured, and lateral restraining means comprising a collar having an aperture and carried by said frame, said load carrying means extending into said aperture for limited lateral movement therein and thereby restraining lateral movement of said load carrying means and reducing side loading on said tension load cell means.

10. A block as defined in claim 9 further characterized in that said frame includes a pair of vertically disposed, spaced apart side walls rigidly secured together, and said tension load cell means extends upwardly between said side walls and are secured to an upper portion of said side walls, said cell means also extending below said side walls for attachment to said cross head.

11. A block as defined in claim 10 further characterized in that said collar is secured between said side walls adjacent the lower portion thereof.

12. A weighing bottom block for cranes, hoists or the like comprising, a main frame including a pair of vertically disposed, spaced apart side walls rigidly secured together; sheave means mounted in said frame adjacent an upper portion thereof; a cross head located adjacent a lower portion of said frame and extending in a generally horizontal direction; tension load cell means having a connection directly with said main frame and also with said cross head, said connections between said tension load cell means and said frame and cross head are comprised of swivel joints to thereby reduce friction and side loading of said cell means, said tension load cell means extending upwardly between said side walls and secured to an upper portion of said side walls, said cell means also extends below said side walls for attachment to said cross head, load carrying means connected to said cross head for suspending a load therefrom, said tension load cell means extendingly deflecting when a load is imposed thereon whereby said deflection can be measured, and lateral restraining means comprising a collar having an aperture and secured between said side walls adjacent a lower portion thereof, and said load carrying means extends into said aperture for limited lateral movement therein and thereby restraining lateral movement of said load carrying means and reducing side loading on said tension load cell means.

References Cited

UNITED STATES PATENTS

| | | | |
|---|---|---|---|
| 2,414,161 | 1/1947 | Moore. | |
| 2,820,624 | 1/1958 | Koegel | 177—147 |
| 3,095,057 | 6/1963 | Kraeling | 177—147 |

ROBERT S. WARD, JR., Primary Examiner

U.S. Cl. X.R.

212—2